United States Patent [19]

Isobe

[11] Patent Number: 4,651,839
[45] Date of Patent: Mar. 24, 1987

[54] RADIATOR SUPPORTING DEVICE

[75] Inventor: Masahiro Isobe, Toyota, Japan

[73] Assignee: Toyota Jidosha Kabushiki Kaisha, Aichi, Japan

[21] Appl. No.: 734,237

[22] Filed: May 14, 1985

Related U.S. Application Data

[63] Continuation of Ser. No. 477,653, Mar. 22, 1983, abandoned.

[30] Foreign Application Priority Data

Jul. 10, 1982 [JP] Japan .................. 57-119187

[51] Int. Cl.⁴ ............ B60K 11/04; B60G 11/22; F16F 7/00; F16M 13/00
[52] U.S. Cl. .................. 180/68.4; 248/635; 267/63 R; 267/141.4
[58] Field of Search ......... 267/57.1 R, 57.1 A, 267/63 R, 63 A, 140.1, 141.2, 141.3, 140.4, 141.4, 141.7, 153, 141, 140.5; D12/163, 166, 167; 165/129, 67, 69, 71; 180/68.4, 300; 248/209, 233, 632, 634, 563, 568, 559, 635

[56] References Cited

U.S. PATENT DOCUMENTS

| | | | |
|---|---|---|---|
| 2,273,869 | 2/1942 | Julzen | 267/153 |
| 2,783,959 | 3/1957 | Boschi et al. | 267/63 R X |
| 2,926,881 | 3/1960 | Painter | 267/141.4 |
| 2,940,785 | 6/1960 | Haushalter | 267/57.1 R X |
| 3,028,665 | 4/1962 | Hirst | 261/141.4 X |
| 3,121,467 | 2/1964 | Bryant | 180/68.4 |
| 3,123,170 | 3/1964 | Bryant | 180/68.4 |
| 3,139,250 | 6/1964 | Turlay | 267/141.4 X |
| 3,463,259 | 8/1969 | Dangauthier | 180/300 X |
| 3,625,501 | 12/1971 | Hein | 267/141 X |
| 3,845,557 | 11/1974 | Bailey | 267/141 X |
| 3,929,201 | 12/1975 | Hoffman | 180/68.4 |
| 3,957,127 | 5/1976 | Bouchard et al. | 267/141.3 X |
| 4,121,682 | 10/1978 | Schaal et al. | 180/68.4 |
| 4,139,053 | 2/1979 | Schaal | 165/71 |
| 4,196,774 | 4/1980 | Hoffmann | 165/69 |
| 4,417,635 | 11/1983 | Thepault | 180/68.4 |
| 4,424,960 | 1/1984 | Dan et al. | 267/153 X |
| 4,538,697 | 9/1985 | Muroi et al. | 180/68.4 |

FOREIGN PATENT DOCUMENTS

| | | | |
|---|---|---|---|
| 0445025 | 3/1969 | Japan . | |
| 48-85319 | 10/1973 | Japan . | |
| 0066142 | 6/1977 | Japan | 248/559 |
| 1026358 | 4/1966 | United Kingdom | 248/559 |
| 1145972 | 3/1969 | United Kingdom | 248/559 |

Primary Examiner—Andres Kashnikow
Assistant Examiner—Robert J. Oberleitner
Attorney, Agent, or Firm—Kenyon & Kenyon

[57] ABSTRACT

A radiator supporting device interposed between a lower end of a radiator and a bracket of a body of a vehicle, comprising an upper flange, a lower flange, a skirt portion and an intermediate portion. Between the upper and lower flanges is formed a gap for preventing interference of both flanges. The outside diameter of the upper flange is smaller than that of the lower flange, and the outside diameter of the skirt portion is smaller than that of the upper flange. By this construction, it is made possible to attain a uniform load applied to the radiator supporting device, ensuring a large deformation of the radiator supporting device and a sure bearing of load by the bracket of the body.

9 Claims, 5 Drawing Figures

FIG.1
FIG.2
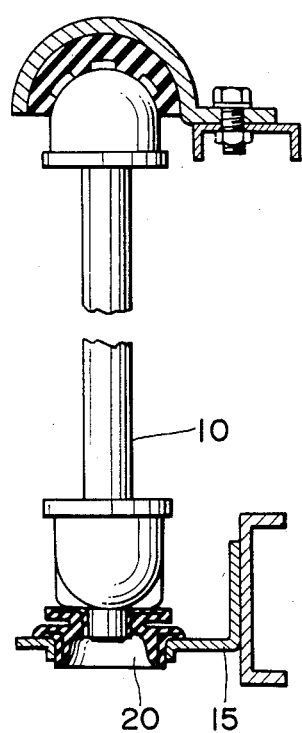
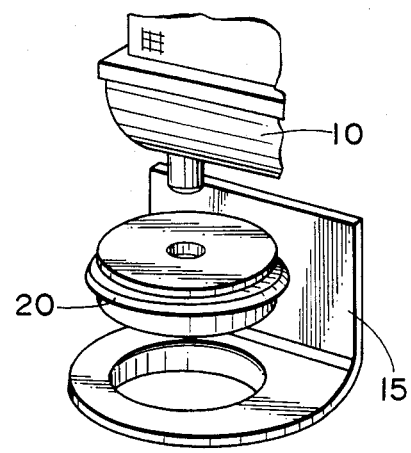

RADIATOR SUPPORTING DEVICE

This application is a continuation of application Ser. No. 477,653 filed Mar. 22, 1983, now abandoned.

BACKGROUND OF THE INVENTION

1. Field of the Invention:

The present invention relates to a radiator supporting device for a vehicle and more particularly to a structure of the radiator supporting device interposed between a lower end of a radiator and a bracket of a body to support the radiator in a floating state.

2. Description of the Prior Art:

There has been proposed a device for damping vibration of a vehicle body during idle running of an engine in which a radiator is supported by a body through an elastic support in virtue of utilizing said radiator as an inertia mass in the vibration system.

In such a device, in order to have the elastic support fully perform its intrinsic function of supporting the radiator in a floating state, it is necessary for the elastic support to have a stable spring characteristic. To attain the stable spring characteristic, the structure of the elastic support must be designed so that the load imposed thereon is made uniform. Moreover, since not only vertical loads but also loads in inclined directions are applied to the elastic support, the elastic support is required to be capable of being sufficiently deformed when such loads in the vertical and inclined directions are imposed on the elastic support. The elastic support is further required to surely transmit such loads in the vertical and inclined directions to the bracket of the body and support the radiator stably.

SUMMARY OF THE INVENTION

The object of the present invention is to provide a radiator supporting device of a floating support structure capable of satisfying the above-mentioned requirements in which metallic rings are integrally disposed in positions near a lower tank of the radiator and near a bracket of a body respectively, to thereby make the load imposed on the radiator supporting device uniform and attain a stabilized spring characteristic.

Another object of the present invention is to provide a radiator supporting device having a portion adapted to undergo a shear deformation against a vertical load and having an interference preventing gap to absorb deformations in the vertical and inclined directions thereby permitting the radiator supporting device to undergo large elastic deformations in the vertical and inclined directions to thereby attain an improved spring characteristic.

Still another object of the present invention is to provide a radiator supporting device capable of surely transmitting vertical and inclined loads imposed thereon from the radiator to the bracket of the body to thereby attain a stable support for the radiator.

In order to achieve the above-mentioned objects, the radiator supporting device of the present invention has an upper flange contacting the lower end of a radiator to bear loads from the radiator, a lower flange seated on the upper surface of the bracket of the body to transmit vertical loads to the bracket of the body, a skirt portion to be inserted in a hole formed in the bracket of the body, and an intermediate portion which connects the upper flange to the lower flange and the skirt portion. Moreover, the entirety of the radiator supporting device of the present invention is essentially constituted of rubber, and rigid rings are embedded in the rubber member in the positions along the lower end of the radiator and along the bracket of the body. Furthermore, the outside diameter $D_1$ of the upper flange is made smaller than the outside diameter $D_2$ of the lower flange, with a gap $\delta$ formed between the lower surface of the upper flange and the upper surface of the lower flange for preventing interference of the upper flange and the lower flange, and the outside diameter $D_3$ of the skirt portion is made smaller outside diameter $D_1$ of the upper flange.

By virtue of embedding rigid rings as described above, the load to be imposed on the radiator supporting device is made uniform. Besides, by setting $D_1$ smaller than $D_2$ and by ensuring the interference preventing gap $\delta$ to be large, interference between the upper and lower flanges is prevented thereby permitting a large deformation of the radiator supporting device. Further, by setting $D_3$ smaller than $D_1$, a sure reaction force of the bracket of the body is obtained. Thus, the foregoing objects of the present invention are achieved.

BRIEF DESCRIPTION OF THE DRAWINGS

The above and other objects, features and advantages of the present invention will become apparent and more readily appreciated from the following detailed description of present preferred exemplary embodiments of the invention, taken in conjunction with the accompanying drawings, in which:

FIG. 1 is a partially sectional side view of a radiator supporting device adjacent to a radiator;

FIG. 2 is a perspective view of a portion supporting the lower end of the radiator of the device of FIG. 1;

DETAILED DESCRIPTION OF THE PREFERRED EMBODIMENTS

Figure 3:
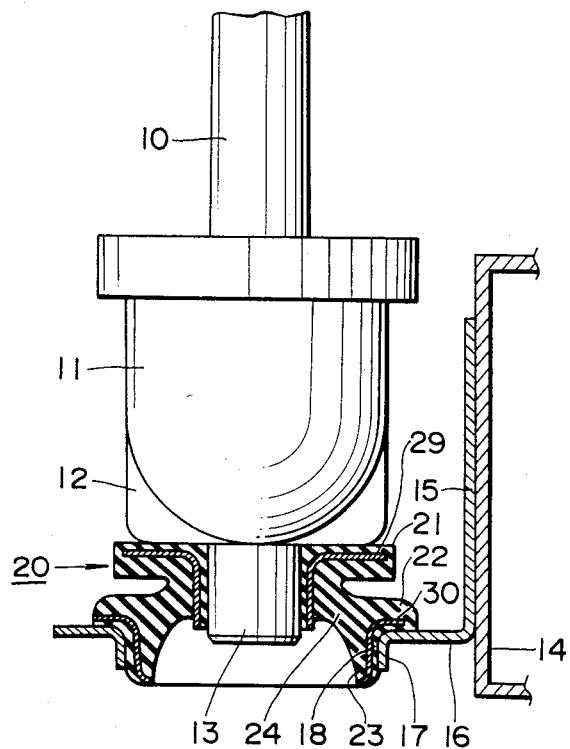
FIG. 3 is a sectional view of a radiator supporting device according to the first embodiment of the present invention and the vicinity thereof.

The radiator supporting device of the present invention will be described hereinunder in accordance with its preferred embodiments and with reference to the accompanying drawings.

Referring first to FIGS. 1 and 2, a radiator 10 is elastically supported at its upper and lower ends by a vehicle body. The reference numeral 20 denotes a radiator supporting device disposed at the lower end of the radiator, which is interposed between the radiator 10 and a bracket 15 of the body.

Figure 4:
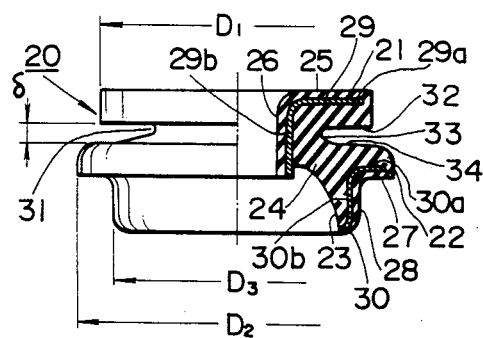
FIG. 4 is a partially sectional front view of the radiator supporting device of FIG. 3.

FIG. 3 shows the structure of the radiator supporting device 20 and the vicinity thereof according to the first embodiment of the present invention, and FIG. 4 shows only the radiator supporting device 20.

As shown in the figures, a cylindrical base 12 is attached to the bottom of a lower tank 11 of the radiator 10, and a cylindrical projection 13 extends downward from the base 12. On the other hand, the bracket 15 of the body is fixed to a front cross member 14 of the body. Said bracket 15 of the body has a tongue portion 16 extending horizontally under the lower end of the radiator 10, said tongue portion 16 being provided with a hole 18, defined by a downwardly extending cylindrical portion 17. Said cylindrical projection 13 of the radiator 10 is coaxially disposed on the central axis of the hole 18 and the radiator supporting device 20 of the present invention is interposed between the radiator 10 and the bracket 15 of the body.

The radiator supporting device 20 comprises substantially an upper flange 21 contacting the lower end of the radiator 10 to bear the load from the radiator, a lower flange 22 seated on the upper surface of the bracket 15 of the body to transmit a vertical load to the bracket 15 of the body, a skirt portion 23 to be inserted in the hole 18 of the bracket 15 of the body, and an intermediate portion 24 connecting the upper flange 21 to the lower flange 22 and the skirt portion 23. The radiator supporting device 20 is formed of an elastic material, for example, rubber, except metallic rigid rings as will be referred to hereinafter.

The upper flange 21 extends radially outward around a central axis of the radiator supporting device 20 at the upper portion of said radiator supporting device 20, and it has a horizontal upper surface 25 abutting against the lower surface of the base 12 of the radiator 10. A vertically extending hole 26 having a circular section is formed in the center of the upper flange 21, and said cylindrical projection 13 of the radiator 10 is tightly inserted into said hole 26.

The lower flange 22 extends radially outward around the central axis of the radiator supporting device 20 under the upper flange 21, and it has a horizontal lower surface 27 seated on the upper surface of the tongue portion 16 of the bracket 15 of the body.

The skirt portion 23 comprises a cylindrical body extending downward from an intermediate portion of the lower flange 22, and its outer peripheral surface 28 extends perpendicularly downward and engages the inner surface of the cylindrical portion 17 which defines the hole 18 formed in the tongue 16 of the bracket 15 of the body.

The intermediate portion 24 comprises a constricted portion adapted to absorb shear deformations and inclined deformations.

In the radiator supporting device 20 having the above-outlined construction, annular rigid rings 29 and 30 made of, for example, metal are embedded in the rubber portion of the radiator supporting device 20 at the positions along the lower end of the radiator 10 and along the bracket 15 of the body, respectively. The rigid ring 29 extending along the lower end of the radiator 10 is an annular ring with a section like that of an angle iron and comprises a horizontal portion 29a extending along the upper surface 25 of the upper flange 21 and a perpendicular portion 29b extending along the hole 26. The rigid ring 30 extending along the bracket 15 of the body is also an annular ring of a section like that of an angle iron and comprises a horizontal portion 30a extending along the upper surface of the tongue portion 16 and a perpendicular portion 30b extending along the inner surface of the cylindrical portion 17. The rigid rings 29 and 30 extend out to positions near the outer edges of the upper and lower flanges 21 and 22 respectively, but they do not project from the outer peripheral surfaces of those flanges 21 and 22.

The outside diameter D1 of the upper flange 21 is made smaller than the outside diameter D2 of the lower flange 22, and the outside diameter D3 of the skirt portion 23, namely, the inside diameter D3 of the hole 18 of the bracket 15 of the body, is made smaller than the outside diameter D1 of the upper flange 21. That is, the outside diameters D1, D2 and D3 stand in the relationship of D3<D1<D2.

Furthermore, between the upper and lower flange 21 and 22 is provided a gap 31 for preventing interference of the upper flange 21 and the lower flange 22, said gap 31 being formed to intrude radially inwards from the outer peripheral surface of the radiator supporting device 20. The gap 31 intrudes radially inwards from the outer peripheral surface of the radiator supporting device 20 to overlie part of intermediate portion 24, thereby to effect a shear deformation of the intermediate portion 24 when the radiator supporting device 20 is loaded in the vertical direction.

The interference preventing gap 31 is defined by a horizontal lower surface 32 of the upper flange 21, an upper surface 33 of the intermediate portion 24 continuing, with a smooth roundness, from the inside end of the lower surface 32 of the upper flange and extending by gradually descending therefrom radially outwards, and an upper surface 34 of the lower flange 22 smoothly continuing to the upper surface 33 of the intermediate portion and extending in the horizontal direction. The gap 31 has a space with a height $\delta$ in the vertical direction.

Figure 5:
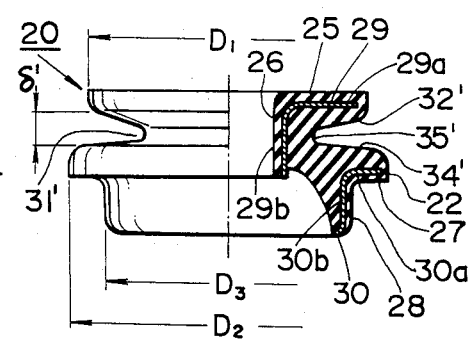
FIG. 5 is a partially sectional front view of a radiator supporting device according to the second embodiment of the present invention.

FIG. 5 shows a radiator supporting device 20 according to the second embodiment of the present invention, which is different from the first embodiment in the shape of the interference preventing gap 31'. In this second embodiment, the interference preventing gap 31' is defined by a lower surface 32' of the upper flange gradually descending radially inwards from the outside edge end, an outer surface 35' of the intermediate portion continuing, with a smooth roundness, to the inside of the lower surface 32' of the upper flange, and an upper surface 34' of the lower flange smoothly continuing to the outer surface 35' of the intermediate portion and extending in the horizontal direction. The gap 31' has a proper height $\delta'$ in the vertical direction. Since the other constructional portions are the same as in the first embodiment, the corresponding portions are indicated by the same reference numerals as in FIG. 4.

The function of the radiator supporting devices of the first and second embodiments having the above-described constructions will now be explained.

The radiator 10 is supported in a floating state above the bracket 15 of the body by means of the radiator supporting device 20, and the radiator 10 containing water is utilized as an inertia mass of a vibration system, thereby affording a remarkable vibration damping effect during idle running of the vehicle.

Such a floating support is attained by elasticity of the rubber portion of the radiator supporting device 20. Particularly, since the intermediate portion 24 is so formed as to be capable of undergoing bath bending and shear deformations, it can sustain large vertical vibrations and inclined swing motions of the radiator 10 in a normal operating condition. In the normal operating condition, contact of the upper flange 21 with and the lower flange 22 is prevented by the interference preventing gap 31 formed therebetween. Provided, however, that in the event of a very large vibration or swing motion, the lower surface 32 of the upper flange will abut on the upper surface 34 of the lower flange to restrain an excessive deformation to thereby improve durability of the radiator supporting device 20.

Further, there is an intrinsic effect of the present invention as follows: Since the rigid rings 29 and 30 are provided in the positions near the lower tank 11 of the radiator and the bracket 15 of the body, a local deformation of the rubber portion can be avoided. Therefore, the load applied to the radiator supporting device 20 is made uniform and the spring characteristic of the radiator supporting device 20 is thereby stabilized and improved.

Moreover, because the outside diameter D1 of the upper flange 21 and the outside diameter D2 of the lower flange 22 stand in the relationship of D1<D2, the approaching amount (t=D1/2 tan $\theta$) of the upper flange 21 with respect to the lower flange 22 becomes small when the radiator 10 is inclined at an angle of $\theta$, thereby permitting a large swing deformation. Besides, a large deformation of the radiator supporting device 20 is permitted because the height $\delta'$ of the gap 31 or 31' is provided by means of a gradually ascending or descending surface such as the upper surface 34 of the lower flange in FIG. 4 or the lower surface 32' of the upper flange in FIG. 5.

Furthermore, because the outside diameter D3 of the skirt portion is smaller than the outside diameter D1 of the upper flange, the load imposed on the upper flange 21 can surely be borne by the bracket 15 of the body located inevitably just under the upper flange, and therefore the strength is improved.

According to the radiator supporting device of the present invention, as set forth hereinabove, it is possible to attain a uniform load applied to the radiator supporting device, a soft spring characteristic permitting a large deformation, and a sure transmission of load from the radiator to the bracket of the body, thereby affording a radiator supporting structure of high reliability having a stable spring characteristic and a high floating effect.

Although only preferred embodiments of the present invention have been described in detail, it will be appreciated by those skilled in the art that various modifications and alterations can be made to the particular embodiments shown without materially departing from the novel teachings and advantages of this invention. Accordingly, it is to be understood that all such modifications and alterations are included within the scope of the invention as defined by the following claims.

What is claimed is:

1. An improved supporting device for a radiator of a motor vehicle, the device having a unitary body made of an elastomeric material, the unitary body having a central axis and comprising:
   a generally cylindrical portion concentric with the central axis and having an axially upper end and an axially lower end opposite the upper end;
   a first flange extending radially outward from the cylindrical portion adjacent to the upper end thereof, the first flange having an outer circumferential edge, an upper face, and a lower face, the upper face of the first flange being adapted to contact a lower end of the radiator and to bear at least part of the weight of the radiator;
   a second flange extending radially outward from the cylindrical portion adjacent to the lower end thereof, the second flange having an outer circumferential edge, an upper face opposed to and spaced from the lower face of the first flange to form an annular gap between said flanges, the inner extent of said gap being defined by the outer diameter of the generally cylindrical portion, and a lower face, the lower face of the second flange being adapted to be seated on an upper surface of a radiator supporting bracket; and
   a skirt portion having a radially outside surface and a radially inside surface, the skirt portion extending axially to a lower edge spaced below the lower face of the second flange and being adapted to be inserted in a hole formed in the bracket, the supporting device further comprising
   a first rigid ring embedded within and bonded to the elastomeric body adjacent to the upper face of the first flange;
   a second rigid ring embedded within and bonded to the elastomeric body adjacent to the lower face of the second flange, and wherein
   the inner surface of the skirt portion extends axially upward and radially inward from the lower edge of the skirt in a smooth curve from a diameter greater than the outer diameter of said generally cylindrical portion to join the generally cylindrical portion, such that the part of the body that connects the first flange with the second flange and skirt portion forms a substantially radially extending intermediate portion, narrower in cross section than the total axial height of the second flange and the skirt portion, which intermediate portion is subjected to shear and bending stresses in response to axial and tilting movements of the first flange with respect to the second flange; and
   the space between the lower face of the first flange and the upper face of the second flange being sufficient to maintain a gap between the upper and lower flanges when the static weight of the radiator is supported by the mount such that there is no contact between the flanges and deflection of the intermediate portion of the device exhibits a stable spring rate in response to vibrations from an engine ofthe motor vehicle.

2. A radiator supporting device as defined in claim 1, wherein said generally cylindrical portion of the rubber body has a hole extending axially from the upper end thereof, said hole being adapted to receive a projection extending from the lower end of the radiator, and the first rigid ring has a first portion extending parallel to the upper face of the first flange and a second portion extending coaxially with said hole in the cylindrical portion.

3. A radiator supporting device as defined in claim 1, wherein the second rigid ring has a first portion extending parallel to the lower face of the second flange and a second portion extending coaxially with the skirt portion and adjacent to the outer surface thereof.

4. A radiator supporting device as defined in claim 3, wherein said second portion of the second rigid ring has a lower edge that curves radially inward toward the inside surface of th skirt portion of the skirt portion of the rubber body.

5. A radiator supporting device as defined in claim 1, wherein the first and second rigid rings embedded in the first flange and the second flange, respectively, have outer caim 1, wherein the first and second rigid rings embedded in the first flange and the second flange, respectively, have outer circumferential edges that extend near the outer edges of the first flange and the second flange, respectively, without projecting beyond the outer peripheral edges of the first flange and the second flange respectively.

6. A radiator supporting device as defined in claim 1, wherein each of the rigid rings is made of metal.

7. A radiator supporting device as defined in claim 1, wherein the lower face of the first flange is substantially perpendicular to the axis of the rubber body and is joined by a smoothly-rounded first fillet to the generally cylindrical portion, and the upper face of the second flange has an inner annular portion that is joined by a smoothly rounded second fillet to the generally cylindrical portion and extends radially outward and axially downward from said second fillet to an outer annular portion that is substantially perpendicular to the axis of the rubber body.

8. A radiator supporting device as defined in claim 1, wherein the lower face of the first flange extends radially inward by gradually descending from the outer circumferential edge of the first flange to join a smoothly rounded first fillet between the first flange and the generally cyclindrical portion, and the upper face of the second flange is transverse to the axis of the rubber body and is joined to the generally cylindrical portion by a smoothly rounded second fillet, and the axial distance between the lower face of the first flange and the upper face of the second flange increases with radial distance from the central axis of the body of the supporting device.

9. A radiator supporting device as defined in claim 1, wherein the outside diameter of the first flange is less than the outside diameter of the second flange, and the outside diameter of the skirt portion is less than the outside diameter of the first flange.

* * * * *